US010069283B2

(12) United States Patent
Strong et al.

(10) Patent No.: US 10,069,283 B2
(45) Date of Patent: Sep. 4, 2018

(54) SWITCHBOARD FOR POWER DISTRIBUTION SYSTEM

(71) Applicant: EATON CORPORATION, Cleveland, OH (US)

(72) Inventors: Ryan Jay Strong, Cypress, TX (US); Terrence Richard Davlin, II, Richmond, TX (US)

(73) Assignee: EATON INTELLIGENT POWER LIMITED, Dublin 4 (IE)

( * ) Notice: Subject to any disclaimer, the term of this patent is extended or adjusted under 35 U.S.C. 154(b) by 0 days.

(21) Appl. No.: 15/648,694

(22) Filed: Jul. 13, 2017

(65) Prior Publication Data

US 2017/0365986 A1 Dec. 21, 2017

Related U.S. Application Data

(63) Continuation of application No. 14/931,080, filed on Nov. 3, 2015, now Pat. No. 9,716,372.
(Continued)

(51) Int. Cl.
*G06F 1/16* (2006.01)
*H05K 5/00* (2006.01)
(Continued)

(52) U.S. Cl.
CPC ............. *H02B 1/24* (2013.01); *H02B 1/04* (2013.01); *H02B 1/06* (2013.01); *H02B 1/20* (2013.01); *H02B 1/21* (2013.01); *H02B 13/00* (2013.01)

(58) Field of Classification Search
CPC ... H02B 1/24; H02B 1/20; H02B 1/21; H02B 1/04; H02B 1/06; H02B 1/22;
(Continued)

(56) References Cited

U.S. PATENT DOCUMENTS 4,945,450 A * 7/1990 Sabatella ............... H02B 1/056
361/609
5,067,043 A * 11/1991 Markowski ............ H02B 1/056
361/611
(Continued)

FOREIGN PATENT DOCUMENTS

JP 2000-295724 A 10/2000

OTHER PUBLICATIONS

European Patent Office, "International Search Report and Written Opinion" (Corresponding PCT/US2016/037316) dated Aug. 29, 2016, 13 pp.

*Primary Examiner* — Anthony Haughton
(74) *Attorney, Agent, or Firm* — Eckert Seamans

(57) ABSTRACT

A switchboard is for a power distribution system having a number of electrical lines. The switchboard includes: an enclosure assembly having a chassis; a switching assembly including a plurality of circuit breakers each coupled to the chassis, each of the circuit breakers having a number of terminal lugs structured to be electrically connected to a corresponding one of the electrical lines; and an isolating assembly including a plurality of isolating apparatus, at least one isolating apparatus being coupled to one of the plurality of circuit breakers. The isolating apparatus separates the number of terminal lugs of the one circuit breaker from the number of terminal lugs of each of the other circuit breakers.

10 Claims, 6 Drawing Sheets

Related U.S. Application Data

(60) Provisional application No. 62/181,524, filed on Jun. 18, 2015.

(51) Int. Cl.
*H05K 7/00* (2006.01)
*H02B 1/24* (2006.01)
*H02B 1/20* (2006.01)
*H02B 13/00* (2006.01)
*H02B 1/06* (2006.01)
*H02B 1/21* (2006.01)
*H02B 1/04* (2006.01)

(58) Field of Classification Search
CPC ........ H02B 1/202; H02B 1/205; H02B 1/207; H02B 1/044; H02B 1/052; H02B 1/066
USPC ...... 361/611, 601; 174/50, 50.51, 50.54, 51, 174/520, 535, 542, 543, 559
See application file for complete search history.

(56) References Cited

U.S. PATENT DOCUMENTS

| | | |
|---|---|---|
| 5,150,091 A | 9/1992 | Hart et al. |
| 5,301,086 A | 4/1994 | Harris et al. |
| 5,847,921 A | 12/1998 | Kim |
| 6,881,898 B2 * | 4/2005 | Baker .................... H02B 1/30 174/50 |
| 7,440,260 B2 | 10/2008 | Parker et al. |
| 7,450,368 B2 | 11/2008 | Parker et al. |
| 8,284,541 B2 | 10/2012 | Shea et al. |
| 8,325,467 B2 | 12/2012 | Shea |
| 2006/0126279 A1 | 6/2006 | Johnson |
| 2010/0027196 A1 | 2/2010 | Schell et al. |
| 2014/0315401 A1 * | 10/2014 | Blasbalg .............. H01R 25/161 439/110 |

* cited by examiner

The disclosed concept pertains generally to switchboards for power distribution systems.

SWITCHBOARD FOR POWER DISTRIBUTION SYSTEM

CROSS-REFERENCE TO RELATED APPLICATIONS

This application is a continuation application of and claims priority to U.S. patent application Ser. No. 14/931,080, filed Nov. 3, 2015, entitled "SWITCHBOARD FOR POWER DISTRIBUTION SYSTEM", which application claims priority from and claims the benefit of U.S. Provisional Patent Application Ser. No. 62/181,524, filed Jun. 18, 2015, also entitled "SWITCHBOARD FOR POWER DISTRIBUTION SYSTEM".

BACKGROUND

Field

The disclosed concept pertains generally to switchboards for power distribution systems.

Background Information

Switchboards or panel boards often include electrical switching apparatus mounted within the interior of an enclosure, as part of an electrical system (e.g., without limitation, power distribution system). Electrical switching apparatus, such as circuit breakers, provide protection for electrical systems from electrical fault conditions such as, for example, current overloads, short circuits, abnormal voltage and other fault conditions. Molded case circuit breakers, for example, include at least one pair of separable contacts that are operated (e.g., opened; closed; tripped open) either manually by way of an operating handle disposed on the exterior of the circuit breaker, or automatically by way of a trip unit, in response to such a fault condition. Some electrical switching apparatus such as, for example, some medium-voltage and low-voltage circuit breakers, can be relatively large. The circuit breakers may be supported within a draw-out frame, commonly known in the art as a cassette or chassis. The switchgear enclosure generally includes a number of compartments or cells, with each cell being structured to receive a corresponding circuit breaker.

In such switchboards, internal components (e.g., without limitation, bus bars and terminal lugs of circuit breakers) are typically exposed. This presents challenges to operators wishing to access the switchboard such as, for example, during tool change outs to change the feeds from several sources. In these situations, it is not desirable to bring down panels when changing, as panels feed many tools.

Thus, there is room for improvement in switchboards for power distribution systems.

SUMMARY

These needs and others are met by embodiments of the disclosed concept, which are directed to a switchboard for a power distribution system in which isolating apparatus isolate internal components of the switchboard from potential operators performing maintenance.

In accordance with one aspect of the disclosed concept, a switchboard for a power distribution system is provided. The power distribution system includes a number of electrical lines. The switchboard comprises: an enclosure assembly comprising a chassis; a switching assembly comprising a plurality of circuit breakers each coupled to the chassis, each of the circuit breakers comprising a number of terminal lugs structured to be electrically connected to a corresponding one of the electrical lines; and an isolating assembly comprising a plurality of isolating apparatus, at least one isolating apparatus of the plurality of isolating apparatus being coupled to one of the plurality of circuit breakers. The at least one isolating apparatus separates the number of terminal lugs of the one circuit breaker from the number of terminal lugs of each of the other circuit breakers.

In accordance with another aspect of the disclosed concept, the switchboard comprises: an enclosure assembly comprising a chassis; a switching assembly comprising a plurality of circuit breakers and a number of bus bars electrically connected to the plurality of circuit breakers, each of the plurality of circuit breakers being coupled to the chassis and being structured to be electrically connected to a corresponding one of the electrical lines, and an isolating assembly comprising a number of insulative blocking members each coupled to the chassis. The number of insulative blocking members are cooperatively structured to isolate the number of bus bars from an interior of the switchboard.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the statement that two or more parts are "connected" or "coupled" together shall mean that the parts are joined together either directly or joined through one or more intermediate parts. As used herein, the phrase "removably coupled" means that one component is coupled with another component in an essentially temporary manner. That is, the two components are coupled in such a way that the joining or separation of the components is easy and would not damage the components. For example, two components that involve easy to access fasteners to be joined are "removably coupled" whereas two components that involve welding processes or glue to be joined are not "removably coupled."

As employed herein, the statement that two or more parts or components "engage" one another shall mean that the parts exert a force against one another either directly or through one or more intermediate parts or components.

As employed herein, the term "insulative member" shall mean a member that substantially inhibits the flow of electricity therethrough, such as, for example, insulative members made of glass polymer materials.

Figure 1:
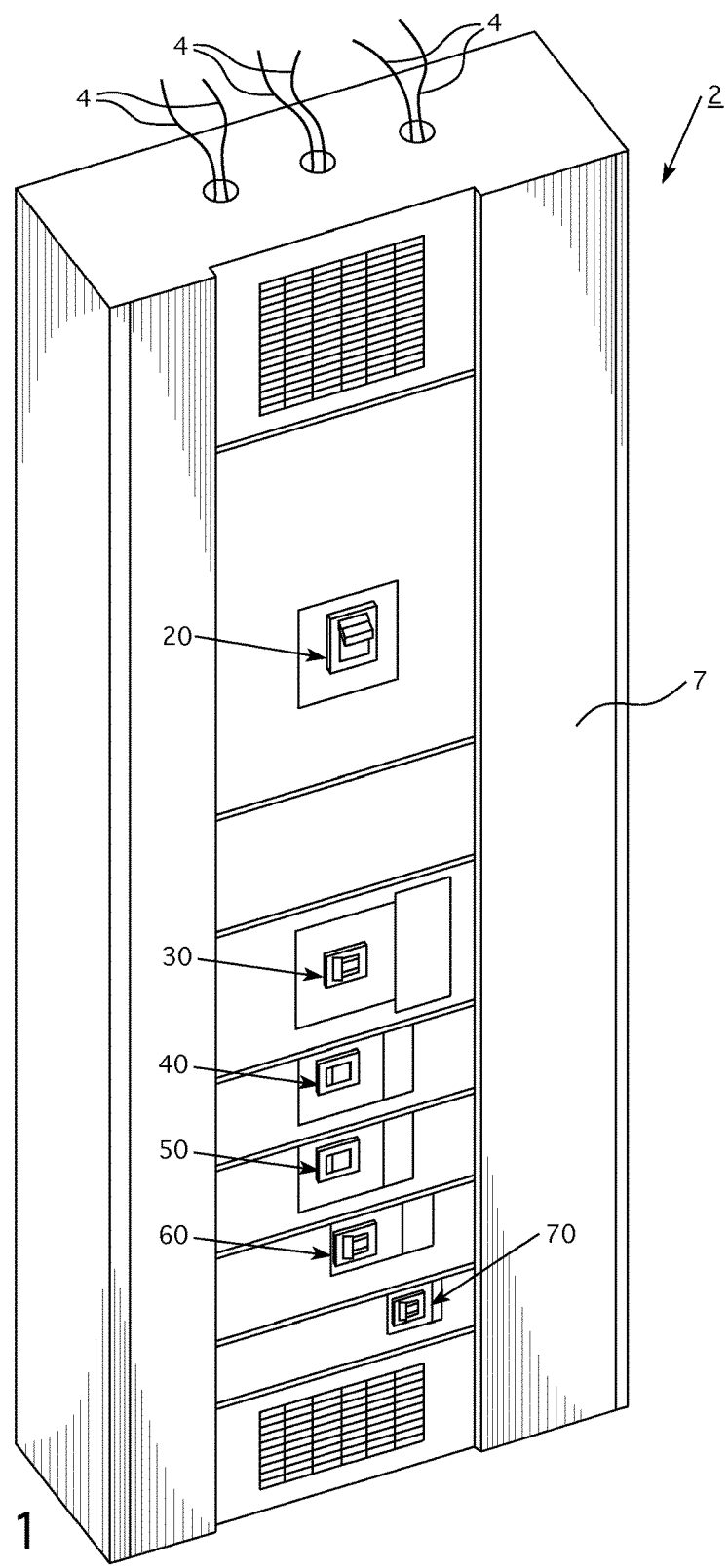
FIG. 1 is a front isometric view of a switchboard, in accordance with a non-limiting embodiment of the disclosed concept.

FIG. 1 shows a switchboard 2 for a power distribution system in accordance with a non-limiting embodiment of the disclosed concept. The switchboard 2 includes an enclosure assembly that encloses a switching assembly and an isolating assembly. The switching assembly is in the form of a main electrical switching apparatus (e.g., main circuit breaker 20), a plurality of branch electrical switching apparatus (e.g., branch circuit breakers 30,40,50,60,70), and a number of bus bars 80,82,84. The branch circuit breakers 30,40,50,60,70 are each electrically connected to the main circuit breaker 20 and to a number of electrical lines 4 (shown in simplified form in FIG. 1) of the power distribution system that enter and exit the switchboard 2. More specifically, the main circuit breaker 20 and the branch circuit breakers 30,40,50,60,70 are each directly connected to the bus bars 80,82,84 in order to allow for the electrical connection. As will be discussed in greater detail below, the isolating assembly is structured to isolate internal components of the switchboard 2 from potential operators performing maintenance on the switchboard 2. As a result, access to the internal components is simplified and safety thereby improved.

Figure 2:
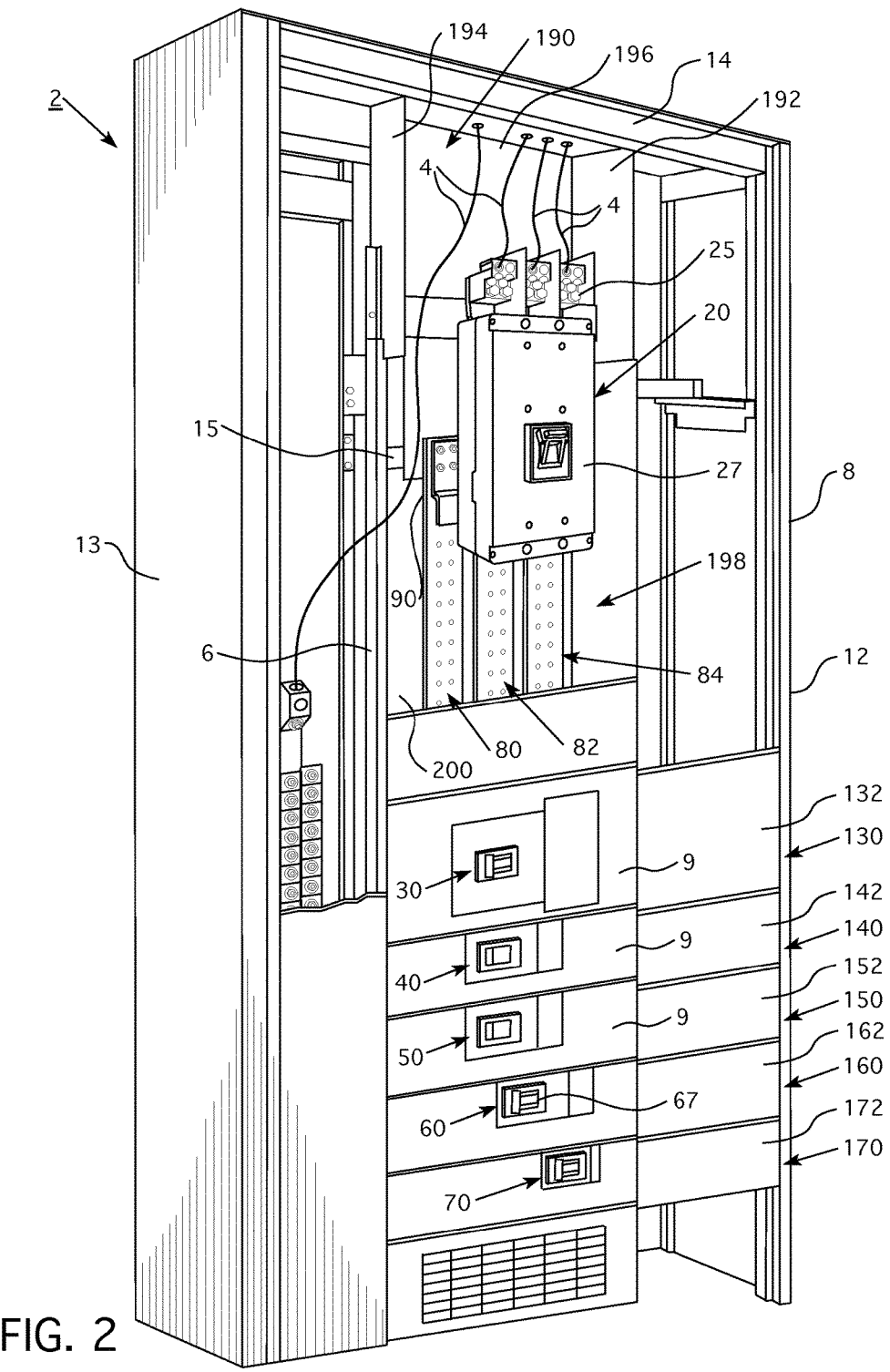
FIG. 2 is another front isometric view of the switchboard of FIG. 1, shown with portions of the enclosure assembly removed in order to see hidden structures.

As shown in FIG. 2, the enclosure assembly includes a chassis 6, a frame 8, and a deadfront 9 coupled to the frame 8. The chassis 6 is coupled to each of the circuit breakers 20,30,40,50,60,70 and to the frame 8. The frame 8 has a first sidewall 12, a second sidewall 13 opposite and parallel to the first sidewall 12, and a third sidewall 14 extending between and being perpendicular to the sidewalls 12,13.

The main circuit breaker 20 advantageously faces in a different direction than the branch circuit breakers 30,40, 50,60,70. More specifically, the main circuit breaker 20 has a number of terminal lugs 25 that face the third sidewall 14. That is, the terminal lugs 25 are located proximate the third sidewall 14, and are between the third sidewall 14 and a body portion 27 (i.e., all of the other components of the main circuit breaker 20 besides the terminal lugs 25) of the main circuit breaker 20. It will be appreciated that each of the branch circuit breakers 30,40,50,60,70 is oriented such that the respective terminal lugs 65 (see terminal lugs 65 of circuit breaker 60, shown in FIG. 4) face the first sidewall 12. That is, the terminal lugs 65 are located between a body portion 67 (see FIG. 2) of the branch circuit breaker 60 (i.e., all of the other components of the branch circuit breaker 60 besides the terminal lugs 65) and the first sidewall 12. In other words, the terminal lugs 65 and the body portion 67 are spaced approximately equal distances from the third sidewall 14. For ease of illustration and economy of disclosure, only the terminal lugs 65 of the branch circuit breaker 60 are shown and described herein, although it will be appreciated that the respective terminal lugs of the branch circuit breakers 30,40,50,70 are oriented the same as the branch circuit breaker 60 (i.e., facing the first sidewall 12). Accordingly, the main circuit breaker 20 is oriented perpendicular with respect to each of the branch circuit breakers 30,40,50,60,70.

As a result of the disclosed construction and/or orientation, the terminal lugs 25 of the main circuit breaker 20 are advantageously isolated from the terminal lugs 65 (and the terminal lugs of the branch circuit breakers 30,40,50,70) of the branch circuit breakers 30,40,50,60,70. The terminal lugs 65 (and the terminal lugs of the branch circuit breakers 30,40,50,70) are electrically connected to corresponding electrical lines 4. Thus, it will be appreciated that access to either the main circuit breaker 20 or the branch circuit breakers 30,40,50,60,70 is safer, as the potential for inadvertent contact is minimized due to the novel spacing between the terminal lugs 25 of the main circuit breaker 20 and the terminal lugs 65 (and the terminal lugs of the branch circuit breakers 30,40,50,70) of the branch circuit breakers 30,40,50,60,70. More specifically, if an operator is attempting to access and perform maintenance on the terminal lugs 65, the potential for inadvertent contact with the terminal lugs 25 will be significantly minimized due to the novel orientation. Additionally, the main circuit breaker 20 may also be oriented such that the terminal lugs 25 face the second sidewall 13 (this embodiment is not shown, but it is within the scope of the disclosed concept), an orientation that likewise provides the disclosed advantages in terms of improved safety.

Continuing to refer to FIG. 2, the isolating assembly of the switchboard 2 includes a number of isolating apparatus 130,140,150,160,170 each coupled to a corresponding one of the branch circuit breakers 30,40,50,60,70. The isolating apparatus 130,140,150,160,170 are structured to isolate the terminal lugs 65 (and the terminal lugs of the branch circuit breakers 30,40,50,70) of the respective branch circuit breakers 30,40,50,60,70 from potential operators performing maintenance, from other internal components (e.g., any one of the bus bars 80,82,84 that are electrically connected to the circuit breakers 20,30,40,50,60,70), and from the electrical lines 4 entering and exiting the switchboard 2.

The isolating apparatus 130,140,150,160,170 each include a respective barrier member 132,142,152,162,172 that is coupled to the frame 8. It will be appreciated that the barrier members 132,142,152,162,172 are structured to slide under the deadfront 9 in order to advantageously prevent access to (i.e., to cover) the terminal lugs 65 (and the terminal lugs of the branch circuit breakers 30,40,50,70) of the respective branch circuit breakers 30,40,50,60,70. That is, the barrier members 132,142,152,162,172 are located between the deadfront 9 and the respective branch circuit breakers 30,40,50,60,70 in order to prevent inadvertent access to the terminal lugs 65 (and the terminal lugs of the branch circuit breakers 30,40,50,70).

Figure 3:
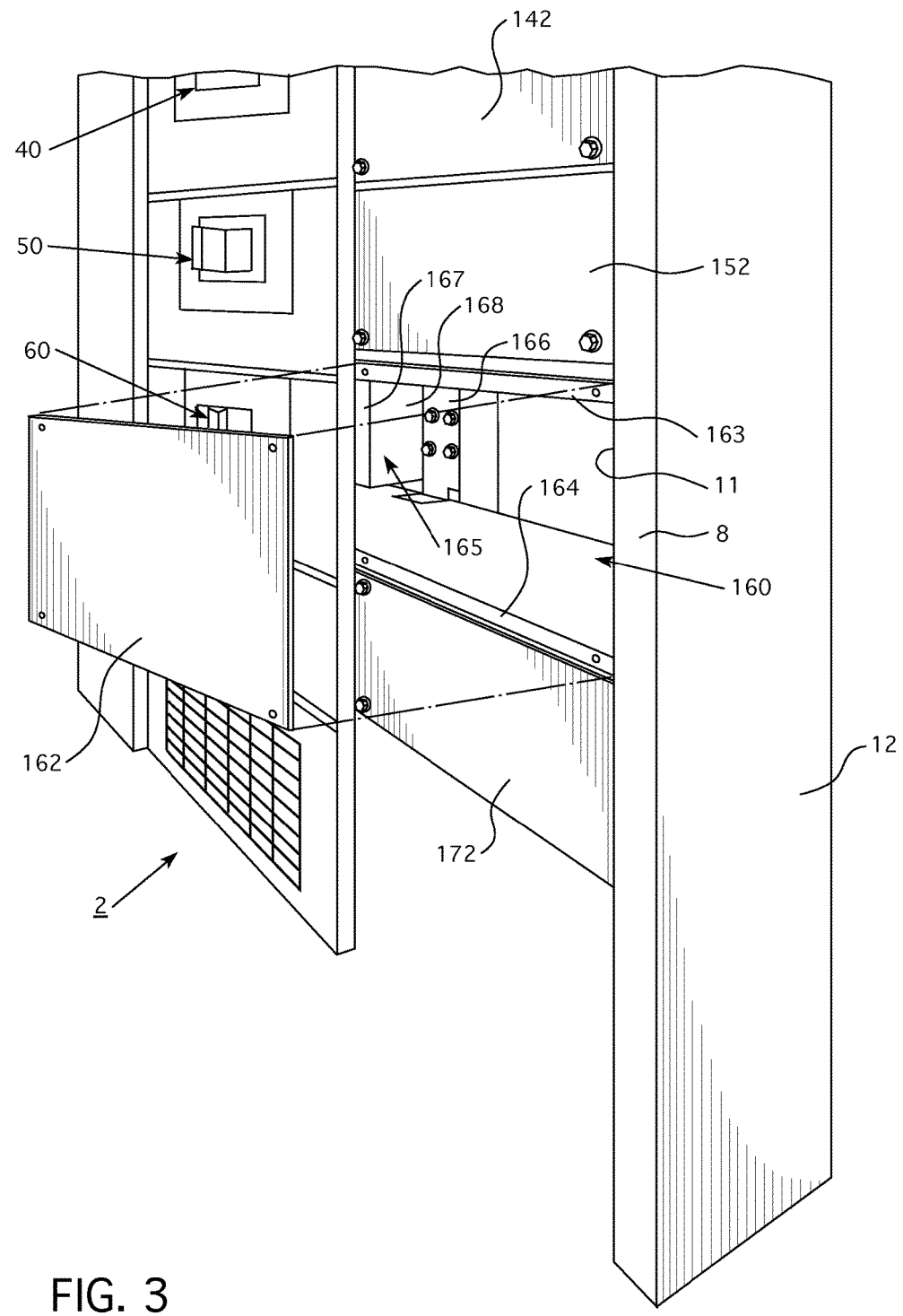
FIG. 3 is a front isometric view of a portion of the switchboard of FIG. 1, and shown with a barrier member exploded in order to see hidden structures.
Figure 4:
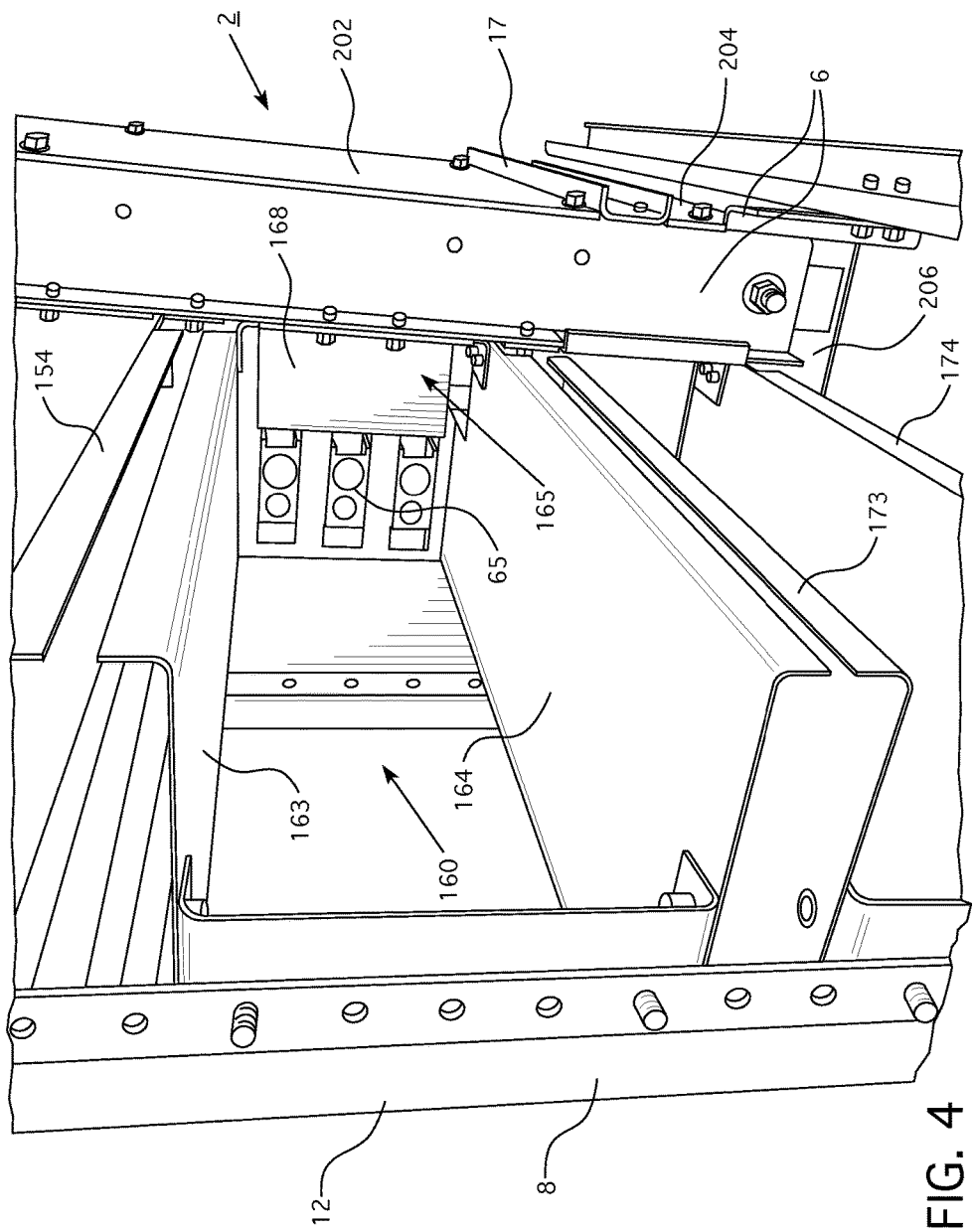
FIG. 4 is a back isometric view of a portion of the switchboard of FIG. 1, shown with portions of the enclosure assembly removed in order to see hidden structures.

FIG. 3 shows an enlarged view of a portion of the switchboard 2 with the barrier member 162 exploded. As shown, the isolating apparatus 160 further includes a first mounting bracket 163 and a second mounting bracket 164 each coupled to the chassis 6 and the frame 8. The mounting brackets 163,164, as shown in FIG. 4, are concave facing away from one another. As a result, electrical lines exiting the branch circuit breaker 60 will advantageously engage the relatively smooth (i.e., curved) surfaces of the mounting brackets 163,164, thereby minimizing the potential for undesirable cutting of the electrical lines.

The barrier member 162 is structured to be coupled to the mounting brackets 163,165 and extend therebetween. Also, the barrier member 162 and the mounting brackets 163,165 extend from the branch circuit breaker 60 to a distal edge portion 11 of the frame 8. In this manner, the barrier member 162 operates to isolate the terminal lugs 65 of the branch circuit breaker 60 from potential operators who have removed an outermost panel 7 (FIG. 1) of the enclosure assembly. It will similarly be appreciated that each of the barrier members 132,142,152,172 likewise operate to isolate the respective terminal ends of the branch circuit breakers 30,40,50,70 from the terminal ends of each of the other branch circuit breakers 30,40,50,60,70.

Additionally, the barrier member 162 is removably coupled to the mounting brackets 163,164 (i.e., and each of the barrier members 132,142,152,172 is removably coupled to respective mounting brackets). As such, operators are advantageously able to readily access the terminal lugs 65 in the event that maintenance needs to be performed. More specifically, if an operator needs to access any one of the branch circuit breakers 30,40,50,60,70, it is not necessary to shut down the entire switchboard 2. That is, because each of the barrier members 132,142,152,162,172 isolates the respective terminal lugs from operators performing maintenance, each of the branch circuit breakers 30,40,50,60,70 may be accessed individually, while the other branch circuit breakers 30,40,50,60,70 remain isolated and thereby protected from inadvertent contact. Stated differently, by simply removing the outermost panel 7 (FIG. 1) of the enclosure assembly and any one of the barrier members 132,142,152, 162,172, the respective terminal lugs 65 (and the terminal lugs of the branch circuit breakers 30,40,50,70) can be accessed without shutting down the entire switchboard 2.

Figure 5A:
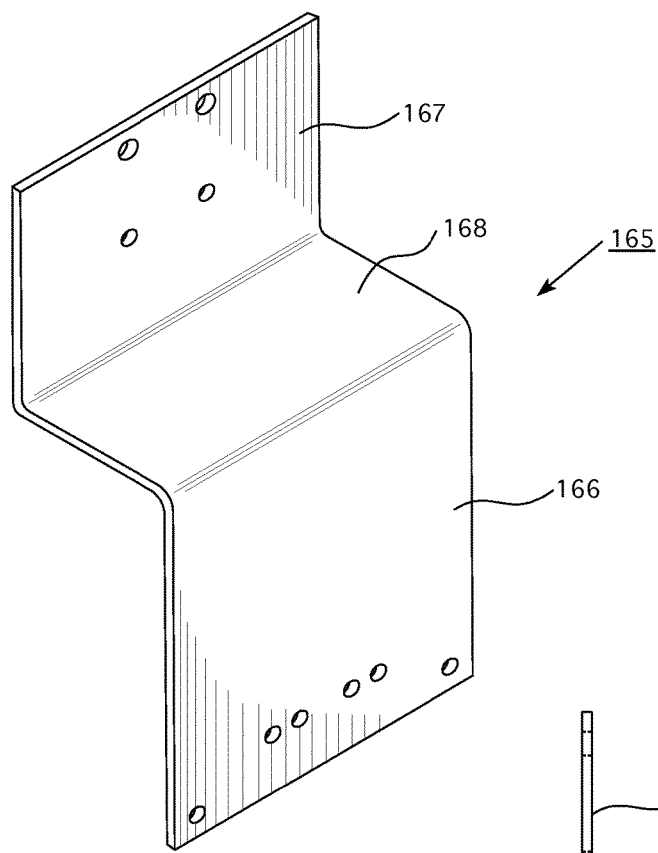
FIGS. 5A and 5B are different views of a barrier member for the switchboard of FIG. 1.
Figure 5B:
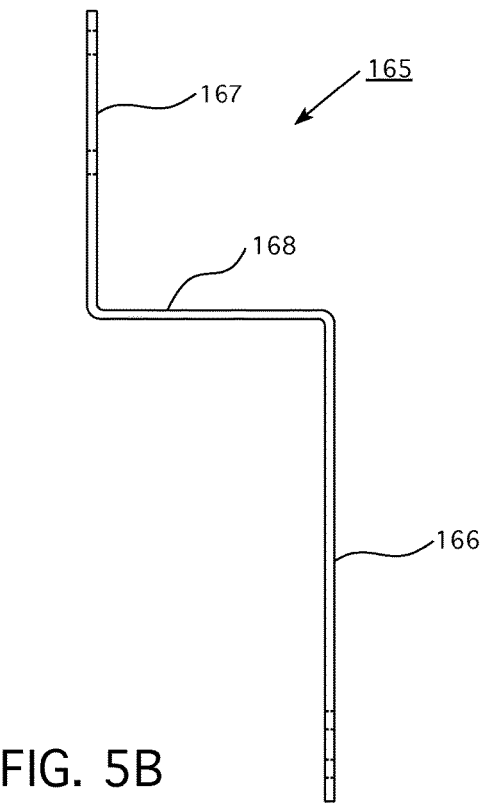

Referring to FIG. 4, the isolating apparatus 160 further includes a second barrier member 165 extending between the mounting brackets 163,164 and being coupled to the chassis 6. FIGS. 5A and 5B show different views of the barrier member 165. As shown, the barrier member 165 includes a first wall 166, a second wall 167, and a third wall 168 extending between and being perpendicular to the first and second walls 166,167. It will be appreciated with reference to FIGS. 3 and 4 that the barrier member 165 prevents inadvertent access to the potentially energized bus bars 80,82,84. That is, unlike prior art switchboards (not shown), in which there is an opening proximate the terminal lugs of the branch circuit breakers by which bus bars can be undesirably contacted, the barrier member 165 advantageously blocks access to the bus bars 80,82,84. For ease of illustration and economy of disclosure, only the barrier member 165 is illustrated, although it will be appreciated that the isolating apparatus 130,140,150,170 include second barrier members shaped substantially the same as the barrier member 165 and configured to prevent inadvertent access to the potentially energized bus bars 80,82,84 proximate the respective branch circuit breakers 30,40,50,70.

The isolating assembly of the switchboard 2 further includes two other barrier members 190,198 coupled to the chassis 6. The barrier member 190 includes a number of walls 192,194,196, the third wall 196 extending between and being perpendicular to the first and second walls 192, 194. Additionally, as shown, the terminal lugs 25 of the main circuit breaker 20 are located between the first and second walls 192,194, which advantageously operate to shield and protect the terminal lugs 25 from potential exposure to an operator performing maintenance on the switchboard 2. Furthermore, the barrier member 198 is coplanar with the wall 192, and extends from proximate the main circuit breaker 20 to proximate the branch circuit breaker 30. In this manner, the barrier member 198 advantageously operates to further protect operators performing maintenance on the switchboard 2, in that potential electrical lines exiting the branch circuit breakers 30,40,50,60,70 will be isolated from an interior of the switchboard 2. That is, in addition to the orientation of the main circuit breaker 20 with respect to the branch circuit breakers 30,40,50,60,70 (i.e., generally perpendicular), discussed above, the barrier members 190,198 further isolate the terminal lugs 25 of the main circuit breaker 20 from the terminal lugs 65 (and the terminal lugs of the branch circuit breakers 30,40,50,70) of the branch circuit breakers 30,40,50,60,70, thereby protecting potential operators performing maintenance.

Figure 6:
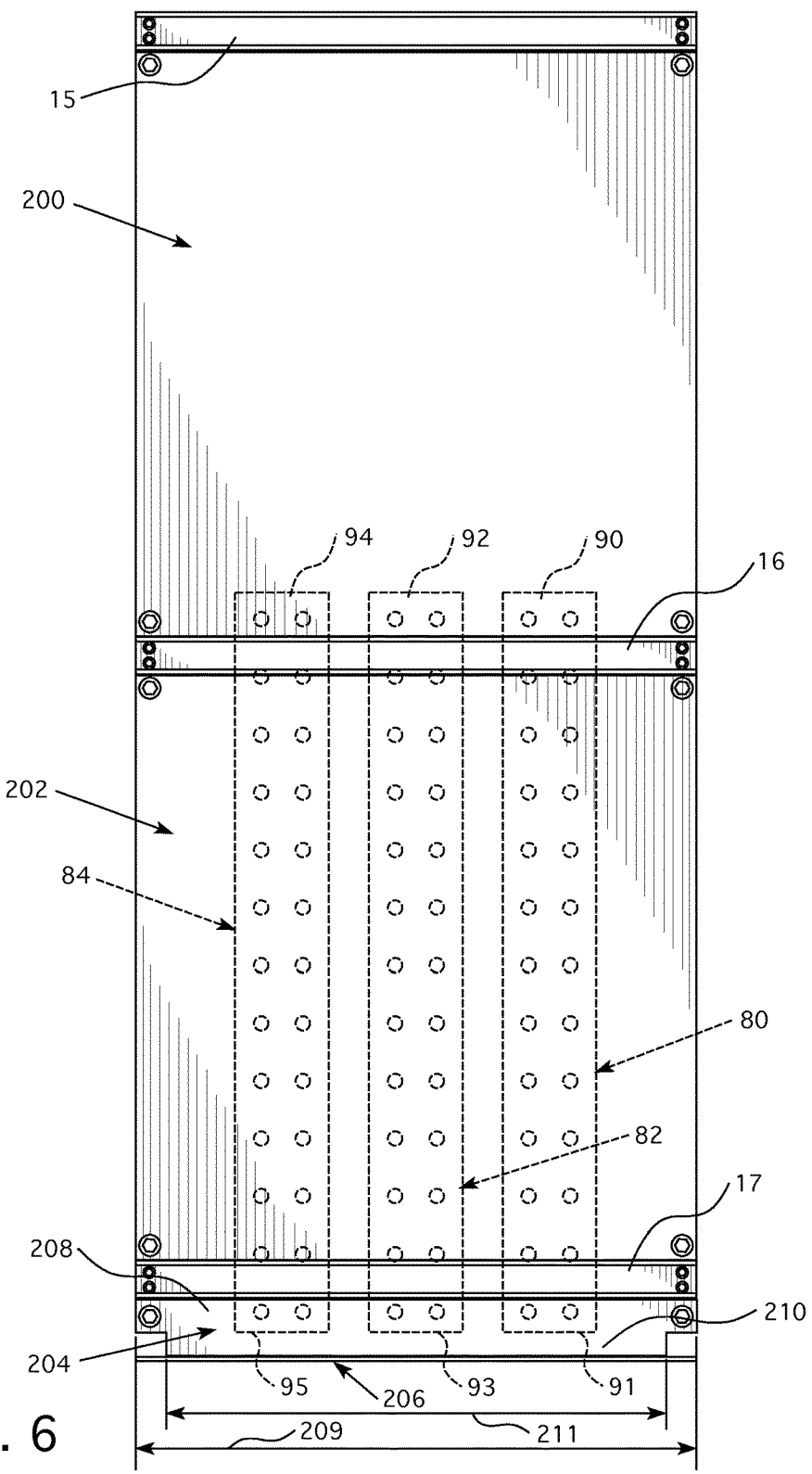
FIG. 6 is a back view of a number of blocking members and a number of channel members for the switchboard of FIG. 1, and shown with the bus bars in hidden line drawing.

As shown in FIG. 2, the isolating assembly further has an insulative blocking member 200 located directly behind each of the bus bars 80,82,84. FIG. 6 shows the insulative blocking member 200, and a number of other insulative blocking members 202,204,206 that are each structured to be coupled to the chassis 6. Additionally, the enclosure assembly includes a number of channel members 15,16,17 located above and between the blocking members 200,202, 204, respectively. The channel members 15,16,17 are each generally C-shaped (see FIG. 4), perpendicular to the bus bars 80,82,84, and coupled to the chassis 6. The blocking member 206 is perpendicular to the blocking members 200,202,204 (see FIG. 4) and the bus bars 80,82,84 (i.e., in FIG. 6, the blocking member 206 extends into the page). Moreover, the blocking members 200,202,204 are generally coplanar with one another. As shown, the blocking members 200,202 extend between the respective channel members 15,16,17. More specifically, the blocking members 200,202, which are rectangular-shaped, substantially seal the area between the respective channel members 15,16,17. Because the blocking members 200,202 (and the blocking members 204,206) are uniform (i.e., devoid of thru holes), a hand or a tool of an operator would not be able to pass through the space between the channel members 15,16,17 and contact the bus bars 80,82,84.

As shown in FIG. 4, the chassis 6 partially extends inwardly. As a result, the geometry of the blocking member 204 is structured to receive the chassis 6. More precisely, the blocking member 204 includes a first rectangular-shaped portion 208 and a second rectangular-shaped portion 210 extending from the first rectangular-shaped portion 208. The portions 208,210 each have respective widths 209,211, the second width 211 being less than the first width 209. As such, in a similar manner as the blocking members 200,202 seal the space between the respective channel members 15,16,17, the blocking member 204, as a result of the novel geometry to accommodate the chassis 6, is advantageously able to seal the space between the channel member 17 and the blocking member 206.

Referring again to FIG. 6, the bus bars 80,82,84 each include respective opposing distal ends 90,91,92,93,94,95. The first distal ends 90,92,94 are located proximate the main circuit breaker 20 (see first distal end 90 in FIG. 2). It will be appreciated that the second distal ends 91,93,95 are located between the respective first distal ends 90,92,94 and the blocking member 206. In this manner, the blocking members 200,202,204,206 advantageously cooperatively isolate and thereby protect the bus bars 80,82,84 from an interior of the switchboard 2, and thus from undesirable contact by an operator. More specifically, the blocking members 200,202,204 prevent inadvertent access to the bus bars 80,82,84 through the back of the switchboard 2. That is, distinct from prior art switchboards (not shown) in which there is open access from a rear of the switchboard to the bus bars through spaces between similar channel members as the channel members 15,16,17, the switchboard 2 advantageously prevents access through the space between the channel members 15,16,17 by way of the blocking members 200,202,204. Similarly, the blocking member 206 prevents inadvertent access to the bus bars 80,82,84 from below. Accordingly, during maintenance of the switchboard 2, operators are advantageously protected from contact with the potentially energized bus bars 80,82,84 by way of the insulative blocking members 200,202,204,206.

Accordingly, it will be appreciated that the disclosed concept provides for an improved (e.g., without limitation, safer, more efficient in terms of maintenance) switchboard 2 in which an isolating assembly is advantageously structured to isolate a number of internal components (e.g., without limitation, terminal lugs 25,65, bus bars 80,82,84) in order to protect operators and advantageously allow maintenance to be performed more efficiently.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A switchboard for a power distribution system comprising a number of electrical lines, said switchboard comprising:
   an enclosure assembly comprising a chassis;
   a switching assembly comprising a plurality of circuit breakers each coupled to said chassis and comprising a number of terminal lugs structured to be electrically connected to a corresponding one of said electrical lines, said plurality of circuit breakers comprising a main circuit breaker and a plurality of branch circuit breakers electrically connected to said main circuit breaker; and
   an isolating assembly comprising a barrier member coupled to said chassis, said barrier member comprising a first wall, a second wall, and a third wall extending between said first wall and said second wall,
   wherein said number of terminal lugs of said main circuit breaker are disposed between said first wall and said second wall.

2. The switchboard of claim 1 wherein said switchboard further comprises a frame coupled to said chassis; wherein said frame comprises a first sidewall, a second sidewall opposite and parallel to said first sidewall, and a third sidewall extending between and being perpendicular to said first sidewall and said second sidewall; and wherein said first wall and said second wall of said barrier member extend from said third sidewall toward each of said plurality of branch circuit breakers.

3. The switchboard of claim 2 wherein said first wall and said second wall of said barrier member are disposed between and are parallel to said first sidewall and said second sidewall of said frame.

4. The switchboard of claim 2 wherein said main circuit breaker is disposed between said third sidewall of said frame and each of said plurality of branch circuit breakers; and wherein said first wall and said second wall of said barrier member do not extend past said main circuit breaker.

5. The switchboard of claim 2 wherein said main circuit breaker has a main operating handle structured to move in a plane parallel to said first sidewall and said second sidewall of said frame; and wherein each of said plurality of branch circuit breakers has a main operating handle structured to move in a corresponding plane perpendicular to said first sidewall and said second sidewall of said frame.

6. The switchboard of claim 1 wherein said third wall is disposed generally perpendicular to said first wall and said second wall.

7. The switchboard of claim 1 wherein said isolating assembly comprises a second barrier member disposed coplanar with said first wall; and wherein said second barrier member extends from proximate said main circuit breaker to proximate one of said plurality of branch circuit breakers.

8. The switchboard of claim 1 wherein said barrier member is a unitary component made from a single piece of material.

9. The switchboard of claim 1 wherein said first wall, said second wall, and said third wall are made from different pieces of material.

10. The switchboard of claim 1 wherein said main circuit breaker has a main operating handle substantially disposed between said number of terminal lugs of said main circuit breaker and each of said plurality of branch circuit breakers.

\* \* \* \* \*